United States Patent [19]

Casu et al.

[11] 4,411,796

[45] Oct. 25, 1983

[54] POLYAMINIC RESIN FOR THE SELECTIVE SEPARATION OF HEPARIN FROM OTHER GLUCOSAMINOGLYCANES AND METHOD FOR THE PREPARATION THEREOF

[75] Inventors: Benito Casu, Milan; Giangiacomo Torri, Bergamo; Giorgio Zoppetti, Milan, all of Italy

[73] Assignee: Crinos Industria Farmabiologica, S.p.A., Villa Guardia, Italy

[21] Appl. No.: 431,732

[22] Filed: Sep. 29, 1982

Related U.S. Application Data

[62] Division of Ser. No. 251,874, Apr. 6, 1981, Pat. No. 4,369,256.

[30] Foreign Application Priority Data

Apr. 18, 1980 [IT] Italy .............................. 21499 A/80

[51] Int. Cl.³ .............................................. C13D 3/14
[52] U.S. Cl. .................................... 210/692; 127/46.2
[58] Field of Search ........................ 210/692; 127/46.2

[56] References Cited

U.S. PATENT DOCUMENTS

3,210,299 10/1965 Hagge et al. ..................... 127/46.2
3,997,483 12/1976 Wurster et al. ..................... 210/692

Primary Examiner—Maurice J. Welsh
Attorney, Agent, or Firm—Browdy & Neimark

[57] ABSTRACT

A novel polyaminic resin obtained by crosslinking a polyalkyleneamine (in particular polyethyleneamine) with diisocyanates in solution, is useful as a selective separation or extraction agent of a component having a "complementary" chemical structure (particularly heparin), by means of mere contact or "ionic exchange" with aqueous solutions containing it. Heparin is thus even quantitatively extracted from solutions containing it alone or in mixture with other glucosaminoglycanes. The polyamine can then release the "adsorbed" heparin and be recovered by a treatment with saline solutions. The novel resin is used in pharmaco-biological fields.

4 Claims, 2 Drawing Figures

IR SPECTRUM OF THE CROSSLINKED RESIN

POLYAMINIC RESIN FOR THE SELECTIVE SEPARATION OF HEPARIN FROM OTHER GLUCOSAMINOGLYCANES AND METHOD FOR THE PREPARATION THEREOF

This is a division of application Ser. No. 251,874 filed Apr. 6, 1981 now U.S. Pat. No. 4,369,256, issued Jan. 18, 1983.

FIELD OF THE INVENTION

The present invention relates to a polyaminic resin which is crosslinked with bifunctional reactants for the aminic and iminic groups (in particular with diisocyanates) and is useful for the selective separation of heparin from solutions containing it alone or in mixture with other glucosaminoglycanes, as well as a process for its preparation.

DESCRIPTION OF THE PRIOR ART

The problem of the separation of heparin (HEP) from other glucosaminoglycanes (GAG), which are also identified as mucopolysaccharides, polyaminosaccharides and aminated polysaccharides, being extracted from animal tissues in the form of mixtures, is usually dealt with by a treatment with quaternary ammonium salts in the presence of inorganic salts in suitable concentrations, which causes the fractional precipitation of GAG complexes (E. J. Scott, Methods Biochem. Anal. 8, 145 (1960)). As an alternative method, heparin can be in particular preferably precipitated by potassium acetate (GB Pat. No. 1,221,784).

Another method for the isolation of heparin consists in filtering it on suitable gels (for instance crosslinked dextran), taking advantage of the penetration of heparin into the lattice pores and the consequent adsorption. A further approach to the isolation of heparin is based on the use of anionic exchange resins, which are generally polystyrene or cellulose derivatives or other crosslinked polysaccharidic derivatives in which functional quaternary ammonium groups were introduced: heparin is preferentially linked by said resins.

None of said methods however turned out to be satisfactory, as several treatment steps for the quantitative recovery of heparin are normally required. This is principally due to the fact that such methods generally take advantage of equilibrium reactions, so that, besides the product to be isolated, also minor but yet remarkable amounts of other components are obtained, which can be regarded as impurities. Thus, for instance, the separating mechanism exploited in the gel filtration technique is based on the fact that molecules having smaller size than the polymeric lattice pores penetrate into them, whereas the larger ones are left out. The importance and criticality of size of the carrier, i.e. the characterization of its porosity, is therefore evident and it is also obvious that the elution technique used in such a method involves in turn the difficulties associated with the partition coefficient.

Another fact which makes difficult the separation of heparin is the competition of other polyamino-saccharides having similar chemical structure, which interfere from a chemico-phisical point of view in the separation reactions.

The separation mechanism of heparin by means of the usual anionic exchange resins can be regarded as a particular kind of adsorption which takes advantage of the greater probability that the anionic sites $-SO_3^-$ and $-COO^-$ of heparin being more numerous than in other GAGs, are attracted by the cationic sites of the resins. However, owing to the generally irregular distribution of such sites in the resins, this process involves only a limited number of anionic groups present in a polysaccharide.

An undoubtedly higher "adsorption" efficiency could be obtained if a series of basic groups in the resin were accessible to a complementary series of acidic groups pertaining to the same heparin chain, particularly if the basic groups of the resin were spaced apart in the same manner as the acidic groups of the polyaminosaccharide are. This complementarity principle accounts for the remarkable stability of the polyelectrolytic complexes, in which the attractive effect of the polyacid by the polybase is magnified with respect to that which could occur if the basic and acidic sites were not part of macromolecular structures.

SUMMARY OF THE INVENTION

On the ground of the above ideas, the present invention relates to a new kind of resin characterized by the presence of sequences of basic groups regularly spaced apart nearly in the same manner as the acidic groups of heparin (according to evaluations on molecular patterns).

DESCRIPTION OF THE PREFERRED EMBODIMENT

Figure 1:
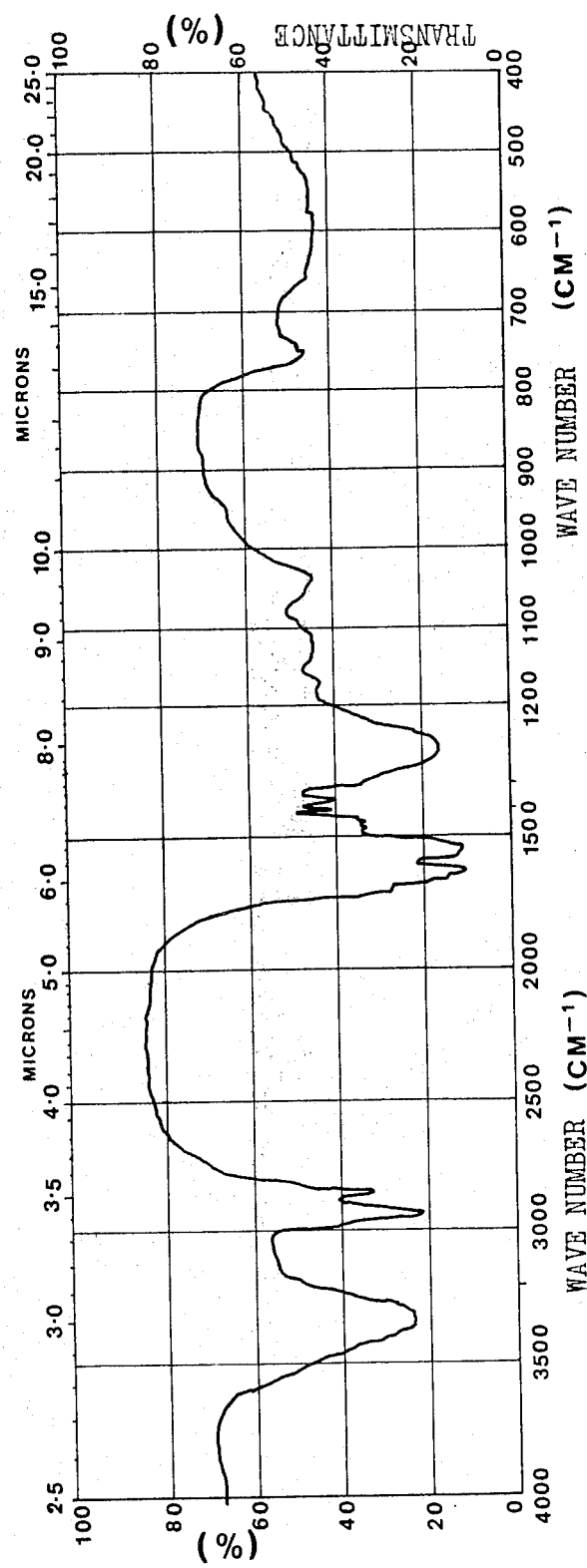

The resin according to the present invention consists of a polyalkyleneamine crosslinked with diisocyanates, particularly polyethyleneamine (also named polyethyleneimine, PEI) crosslinked with hexamethylenediisocyanate (HMDC), having an average molecular weight in the range from about 150 to 120,000. The crosslinking of PEI chains is carried out both to render insoluble the polymer and to obtain, thanks to the transversal links of the crosslinking agent, gaps which can be reached by the solvent and heparin molecules, as well as to suitably limit the sequences of basic sites capable to bind with heparin.

The crosslinking of polyethyleneamine chains is obtained by means of an alkylenediisocyanate, with the formation of transversal links of carbamic nature. In particular the crosslinking with hexamethylenediisocyanate of PEI in its more usual, widely branched form takes place according to scheme (A) for the branched part and according to scheme (B) for the non-branched part:

SCHEME A

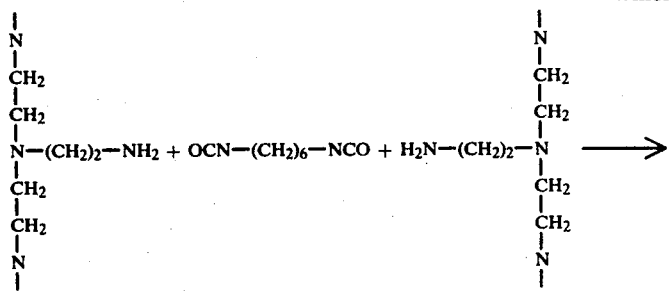
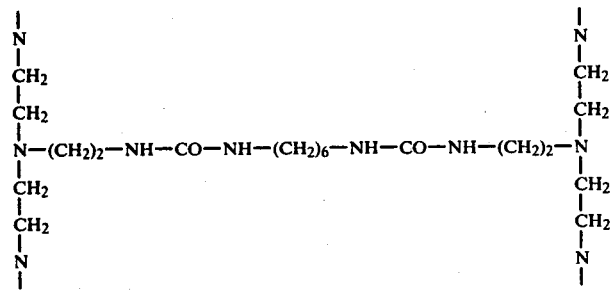
SCHEME B
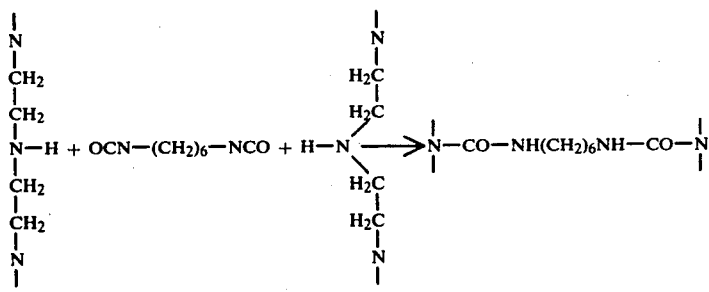
so as to cause a tridimensional structure to be formed, which may be assumed to be as follows:

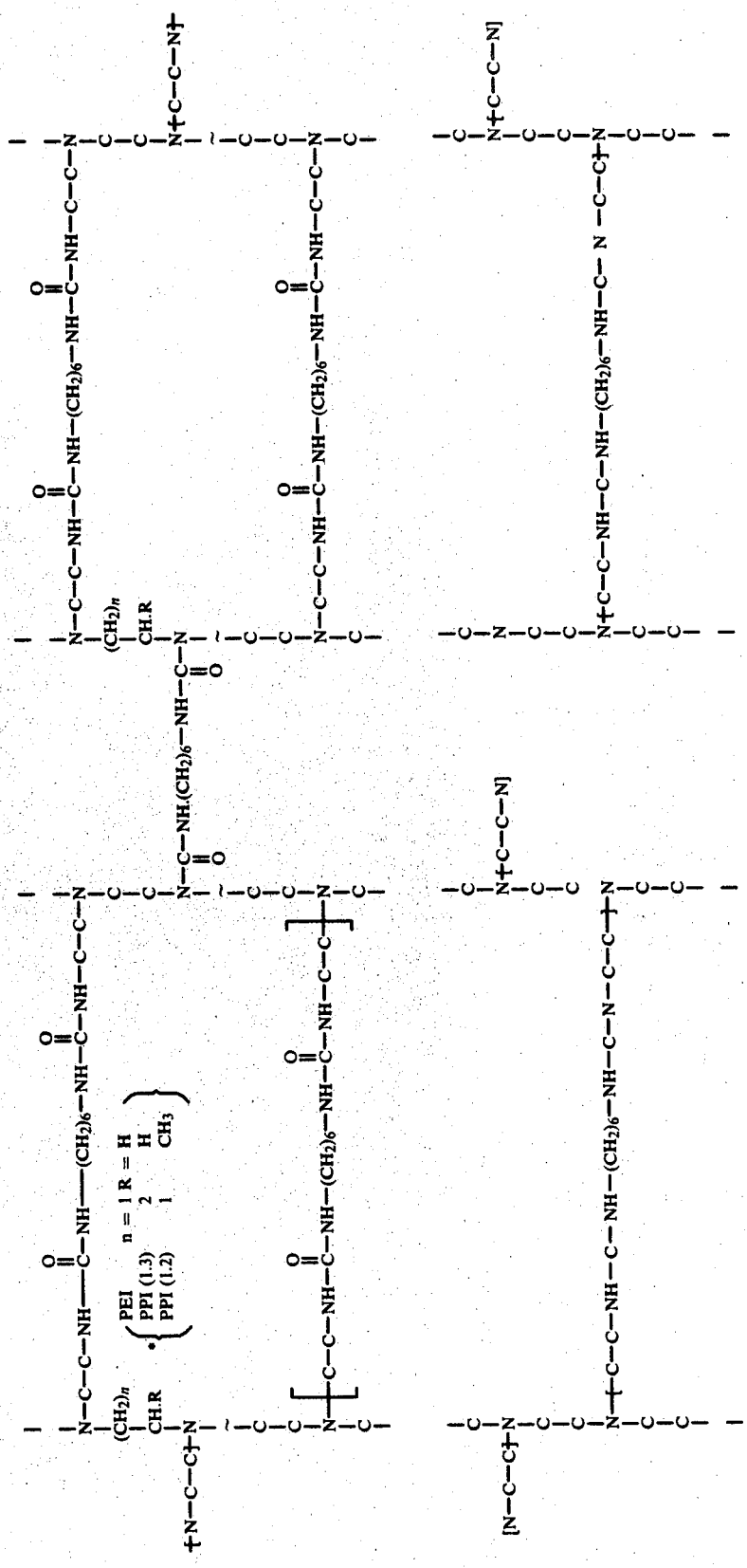

The amount of alkylene-diisocyanate used for the crosslinking step, given as the molar ratio of the diisocyanate regarded as monofunctional with respect to the monomeric unit making up the polyalkyleneamine, is comprised between about 10 and 15 moles per 100 moles of polymer (based on the monomeric unit). Thus, for instance, 12 moles of hexamethylenediisocyanate (regarded as monofunctional), added to 120 moles of polyethyleneamine (based on the monomeric unit) give a crosslinked resin which is insoluble in water and in organic solvents. HMDC and PEI are currently used in the form of a solution in an organic solvent (preferably chloroform) at 5% in volumetric ratios corresponding to about 1:5. While the preferred ratio between the resin and the crosslinking agent is as given above, also different ratios between the two reactants give similarly insoluble resins having a different crosslinking ratio, the relevant yields being comparatively low for the lowest crosslinking ratios. It should be noted in this connection that starting from a PEI having a comparatively low molecular weight (for instance about 600, corresponding to a polymerization degree of about 14) the end $NH_2$-groups react likely in a preferred way with HMDC; in such conditions and for molar ratios of about 1:10 between OCN— and NH—+$NH_2$— groups, it is believed that sequences of units ($CH_2$—$CH_2$—NH)n, wherein n=8–14, are formed, which are extended enough to have a co-operative effect in the association with polyanions.

The present invention will be more particularly explained on the basis of some embodying examples which are only given for illustrative and non-limiting purposes.

EXAMPLE 1

Preparation of crosslinked polyethyleneimine

To 20 ml of a solution at 5% (w/v) of hexamethylenediisocyanate in chloroform at room temperature 100 ml of a chloroformic solution at 5% (w/v) of polyethyleneimine having an average molecular weight of 1800 were slowly added under stirring. After about 15 minutes a white bulky precipitate was formed of a polyethyleneiminic resin having a crosslinking degree of 0.1, which was then separated by decantation and washed three times with 10 ml each of chloroform. The precipitate still containing some chloroform was then washed three times with 10 ml each of distilled water and kept under water.

The calculated yield of dry product was 75–80%.

EXAMPLE 2

This example proceeded according to Example 1, except that a polypropyleneimine having an average molecular weight of 1000–1500 was used instead of polyethyleneimine, thus obtaining a polypropyleneiminic resin having a crosslinking degree of 0.05 with a yield of product equal to 90% on a dry basis.

FIG. 1 shows a typical infra-red spectrum of resins obtained according to Examples 1 and 2. The examination of IR spectrum allows, besides the identification of the resins, also a semiquantitative evaluation of the ratio between the crosslinking agent and the polyiminic chain as well as the verification that HMDC reacted bifunctionally.

By the term "crosslinking degree" herein it is meant the number of monomeric units comprising NH—(and-/or $NH_2$—) groups involved in the crosslinking reaction on the basis of the molecular ratio between the diisocyanate taken as monofunctional and the polyamine taken as a monomeric unit. The crosslinking degree is chosen so that in the crosslinking step no more than a quarter of the aminic groups of polyalkyleneamine are involved.

Treatment tests of water solution of heparin and other glucosaminoglycanes with the crosslinked resin have shown that heparin has a remarkable affinity for the resin. The concentration range in heparin of aqueous solutions containing also other polyaminosaccharides, in which the action of the crosslinked resin according to the present invention allows to quantitatively separate heparin is comprised between 0.1% and 1% by weight as it comes out from the following examples.

Heparin adsorbed on the resin can be recovered and the resin regenerated for a subsequent reuse by treating the resin containing heparin with suitable saline solution, for instance a water solution of NaCl from about 1.5 to 2.5 M.

EXAMPLE 3

Selective separation of heparin 20 ml of an aqueous solution at 0.2% by weight of a mixture of glucosaminoglycanes extracted from swine duodenum containing 20% heparin, 30% heparansulfate, 20% chondroitinsulfate and dermatansulfate as well as 10% of hyaluronic acid were contacted with 2 g of a polyethylenic resin having a crosslinking degree of 0.1 obtained according to Example 1, which was preconditioned for 30' at pH 3.5 (in the presence of HCl) and then washed twice with 10 ml water.

Figure 2:
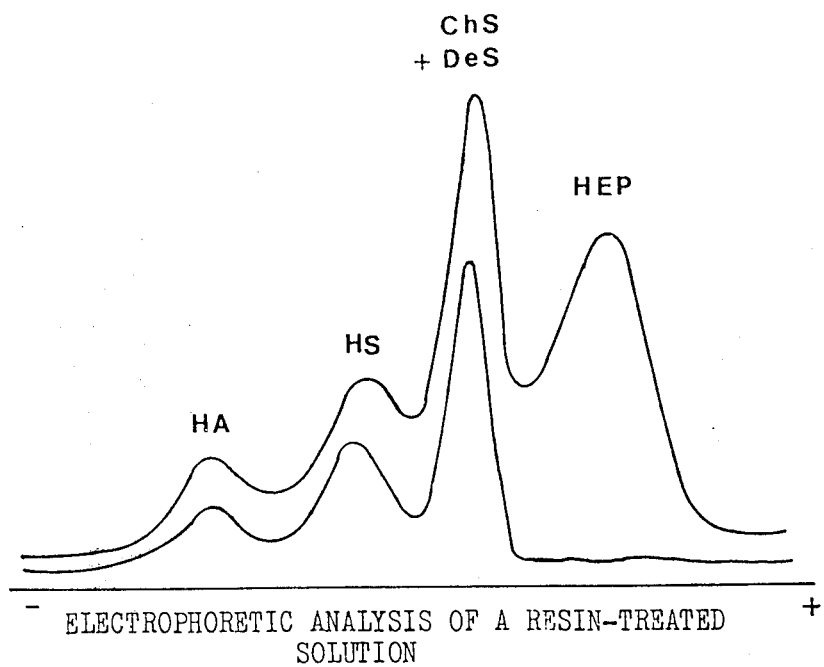

After 2 hours of contact under stirring, heparin was quantitatively and selectively adsorbed by the resin, as shown by the electrophoretic analysis whose diagram is given in FIG. 2.

From such a diagram, in which the upper line refers to the glucosaminoglycane solution before the treatment and the lower line relates to the same solution after the treatment with the crosslinked PEI, it can be seen that heparin does not absolutely appear from the treated solution, whereas the peaks concerning hyaluronic acid (HA), heparansulfate (HS) and chondroitinsulfate plus dermatansulfate (ChS+DeS) are still present.

EXAMPLE 4

20 ml of an aqueous solution containing a mucopolysaccharidic fraction consisting of heparansulfate (85%) and heparin (15%) were contacted for 2 hours with 4 g of a polyethyleneiminic resin having a crosslinking degree of 0.05, which was previously conditioned for 30' at a pH 3.5 (by means of HCl) and then washed twice with 10 ml of water. At the end of the contact time under stirring, the electrophoretic analysis of the solution showed the complete disappearance of heparin.

The still dissolved heparansulfate was simply recovered by evaporation of the solution with a yield of 95%.

EXAMPLE 5

10 ml of an aqueous solution of heparin at 0.1% (corresponding to 10 mg of the mucopolysaccharide) were treated for 2 hours with 800 mg of crosslinked PEI according to the present invention. At the end of the treatment, heparin was quantitatively adsorbed by the resin, as shown by colorimetric tests carried out on the remaining liquid with toluidine blue and carbazole in the presence of borates.

EXAMPLE 6

An aqueous solution of a mixture of glucosaminoglycanes comprising 18% heparin was treated with crosslinked PEI according to the operating conditions described in Example 3. The quantitative electrophoretic analysis showed that heparin is quantitatively and selectively adsorbed.

EXAMPLE 7

Recovery of heparin from crosslinked PEI 2 g of polyethyleneiminic resin containing 8 mg adsorbed heparin according to example 3 were extracted 5 times by treatment for 30' under stirring with 20 ml NaCl 2 M each time. The collected extracts contained 95–96% of the heparin originally adsorbed by the resin as shown by a colorimetric analysis by means of carbazole with reference to a calibration curve in NaCl 2 M.

Heparin was separated from the extraction solution by means of a desalting step carried out by dialysis or by means of precipitation with quaternary ammonium salts.

Although the present invention has been explained on the basis of some examples with particular reference to the separation of heparin from mixtures containing it, it was found that the affinity of the crosslinked polyamine according to the present invention to other polyaminosaccharidic components of such mixtures can be varied and fitted according to single cases by suitably modifying both the crosslinking degree of the resin and the pH and strength of the contacting solution. As a matter of fact, the polyamines crosslinked according to the present invention can be obtained with different granulation and pore sizes according to the number of crosslinking bonds, i.e. to the diisocyanate percentage. Thus, polyamines having few crosslinking bonds increase their volume in an aqueous solution up to many times with respect to that of the dry product, whereas those polyamines having a high crosslinking degree, i.e. many crosslinking bonds, undergo little volume change. In these latter, the texture is much more stiff and allows therefore only molecules having a comparatively low weight to penetrate, whereas the ionic exchange is concurrently much slower due to the increased resistance to the motion of the hydrated counterions coming from the resin. A higher pore size renders the polyamine according to the present invention more easily accessible to molecules having larger dimensions which can therefore be separated from smaller molecular species.

Besides the described effects, the crosslinking degree fixes the number of sequential NH—(and NH$_2$—) groups which are available to the complementary interaction with the polyanion which penetrated the tridimensional lattice. On the other side, by taking advantage of pH and ionic strength, the number of such NH—(and NH$_2$—) groups being equal, there becomes modified the ratio between the groups having really a positive charge which can therefore increase the adsorption strength due to the formation of ionic bonds with the anionic groups of the polysaccharide and those groups which are free of charge.

The crosslinked polyamine according to the present invention can therefore be used both to separate the desired GAG, particularly heparin, and to eliminate from a mixture of dissolved GAGs the undesired component, for instance heparin when a preparation free of anticoagulant properties is desired.

Although the present invention has been described with reference to some preferred embodying examples with particular attention to heparin, it will become obvious to those skilled in the art that variations and/or changes can be introduced without coming out of the protective scope of the invention. As crosslinking agents, further bifunctional reactants can thus be used, such as arylenediisocyanates, or dialdehydes or also heterocyclic compounds such as trichlorothiazine, whereas water can be used as a solvent, particularly in the case of dialdehydes.

What we claim is:

1. A method for selectively adsorbing a single mucopolysaccharidic compound from a mixture of glucosaminoglycanes in an aqueous solution, wherein said solution is contacted under stirring with a polyalkyleneamine crosslinked by means of a diisocyanate, the crosslinking degree, based on the molar ratio between said diisocyanate regarded as monofunctional and said polyalkyleneamines regarded as monomeric units, ranging from 0.1 to 1.0.

2. The selective adsorption method according to claim 1, wherein the average length, structure and polarity of the chains comprised between the crosslinking points of said crosslinked polyalkyleneamine are substantially complementary to those of polar portions pertaining to said mucopolysaccharidic compound to be adsorbed.

3. A method for separating a mucopolysaccharidic compound selectively adsorbed by a crosslinked polyalkyleneamine according to claim 2, wherein said crosslinked polyalkyleneamine containing said glucosaminoglycane is recovered in its original form by repeatedly treating it with a 1.5–2.5 M solution of NaCl, the said glucosaminoglycane present in the obtained solution being then isolated in a known manner by means of dialysis or by precipitation with quaternary ammonium salts.

4. The selective adsorption method according to claim 2, wherein said mucopolysaccharidic compound is heparin.

* * * * *